J. KOSTOLEK.
MILK BOILER.
APPLICATION FILED FEB. 5, 1917.
1,255,021.
Patented Jan. 29, 1918.
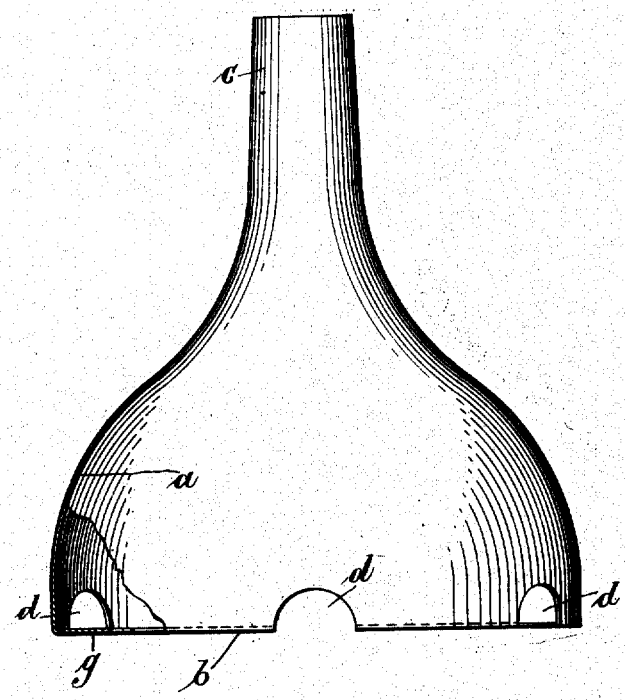
Inventor
John Kostolek
By his Attorney
L. K. Böhm.

UNITED STATES PATENT OFFICE.

JOHN KOSTOLEK, OF NEW YORK, N. Y.

MILK-BOILER.

1,255,021.  Specification of Letters Patent.  Patented Jan. 29, 1918.

Application filed February 5, 1917. Serial No. 146,633.

*To all whom it may concern:*

Be it known that I, JOHN KOSTOLEK, a citizen of the Empire of Austria, and a resident of New York, county of the Bronx, State of New York, have invented certain new and useful Improvements in Milk-Boilers, of which the following is a specification.

This invention has reference to a novel milk boiler and pertains particularly to a device to be applied in a vessel containing the milk to be boiled. The novel milk boiler prevents the boiling over of the milk from the vessel in which it is boiled.

When milk is boiled in an ordinary vessel and not carefully watched then, at a certain moment, it bubbles up under the action of the heat applied thereto and boils over whereby part of the milk is lost. The overflowing part of the milk when reaching the hot stove or range is burned up and causes bad odors. Furthermore the stove or range or the protective pan found in modern gas ranges has to be cleaned.

It is the special purpose of the present invention to produce a device to be applied in milk boiling vessels for the purpose of avoiding the described boiling over of the milk, the loss of part of it and the inconveniences hereinbefore mentioned. The novel device when applied in a vessel contaning milk to be boiled prevents any loss even in the temporary absence of the cook or other person. The construction of the novel device is such that it preferably extends somewhat beyond the milk boiling vessel. It is broad at the bottom and forms a narrow neck at the top and means are provided in its lower portion to insure a perfect circulation of the milk while heat is applied thereto and also means, which will hold the boiler steadily on the bottom of the vessel while the boiling takes place and will prevent it from being thrown about and lifted during the boiling process. While a certain standard size of the device answers for certain quantities of milk usually boiled by private people larger quantities of milk require a larger size of the same. In addition to these main objects the construction of the device is so simple as to keep the cost of production at a minimum and care has been taken to produce a neat and desirable article, all as will be fully described hereinafter with reference to the accompanying drawing in which:

The figure in the drawing illustrates a side elevation of a milk boiler according to my invention.

Similar characters of reference denote like parts.

The novel device to be applied in milk boiling vessels usually is made of metal such as brass, copper, iron sheeting, aluminum and the like. It is preferably produced by stamping and may be finished as enamel iron ware or it may be electro-plated, for instance nickel-plated.

The device comprises a body portion $a$ which is widest at the bottom and completely open there. From the bottom edge $b$ the device is curved and further up gradually reduced in diameter forming at the top a narrow neck $c$. Thus the inner surface represents a gradually curved surface along which the boiling milk quietly passes. In order to insure a free circulation of the boiling milk the bottom portion of the device is provided with a plurality of notches $d$ which are practically of semi-circular shape and widest at the bottom.

Assuming now that the device has been placed in vessel containing a liquid or milk and assuming that heat is applied to the vessel from below then the milk becomes hot and at a certain moment bubbles up and rises within the device and upon reaching the open top end of the narrow neck $c$ flows over and down on the outer surface of the device back into the vessel. In this manner no milk is lost even in the absence of the cook or other person.

Various sizes of the device are made. A standard size of about five and one-half inches in diameter at the bottom curved and reduced in an upward direction as shown, and having a neck of about one inch in diameter at the top answers for a quantity of milk of from one to three quarts. The height of this device is approximately six to six and one-half inches. If but little milk is in the vessel reaching not far beyond the openings $d$ then the formation of steam may lift the device which is objectionable. If the openings $d$ at the bottom are too large then the boiling will not go on as quietly as desired. The sizes mentioned above have been found by tests to produce good results.

The boiler is provided at the bottom with inwardly directed flanges $g$ extending between the openings $d$. These flanges have even outer surfaces flush with the lower edges of the utensil a and are adapted to bear on the bottom of the vessel c. Owing to the capillary action of the liquid between them and the said bottom these flanges will adhere very firmly to the bottom while the boiling of the liquid proceeds whereby the boiler a will be held from being thrown about or lifted so that a quiet boiling of the liquid can take place.

I claim as my invention:

In a liquid boiling utensil the combination with a vessel having a flat bottom, of a curved flask open on top and bottom and consisting of a body portion widest at its bottom and gradually reduced in diameter to form a comparatively very narrow neck at its top, said flask having at its bottom a number of notches distributed around its circumference and inwardly directed flat flanges arranged between said notches, the outer surface of said flanges being even and flush with the bottom edge of the flask and adapted to rest on the flat bottom of the vessel so that the capillary action of the liquid between said flanges and the bottom will hold the flask firmly in position during the boiling process.

Signed at New York, N. Y., this 3rd day of February, 1917.

JOHN KOSTOLEK.

Witnesses:
SIGMUND RUBIN,
LILLEY E. SCHMIDT.

Copies of this patent may be obtained for five cents each, by addressing the "Commissioner of Patents. Washington, D. C."